INVENTORS
WILLIAM K. GREGORY
JOHN F. BABBITT
LANGSTON P. BRYANT

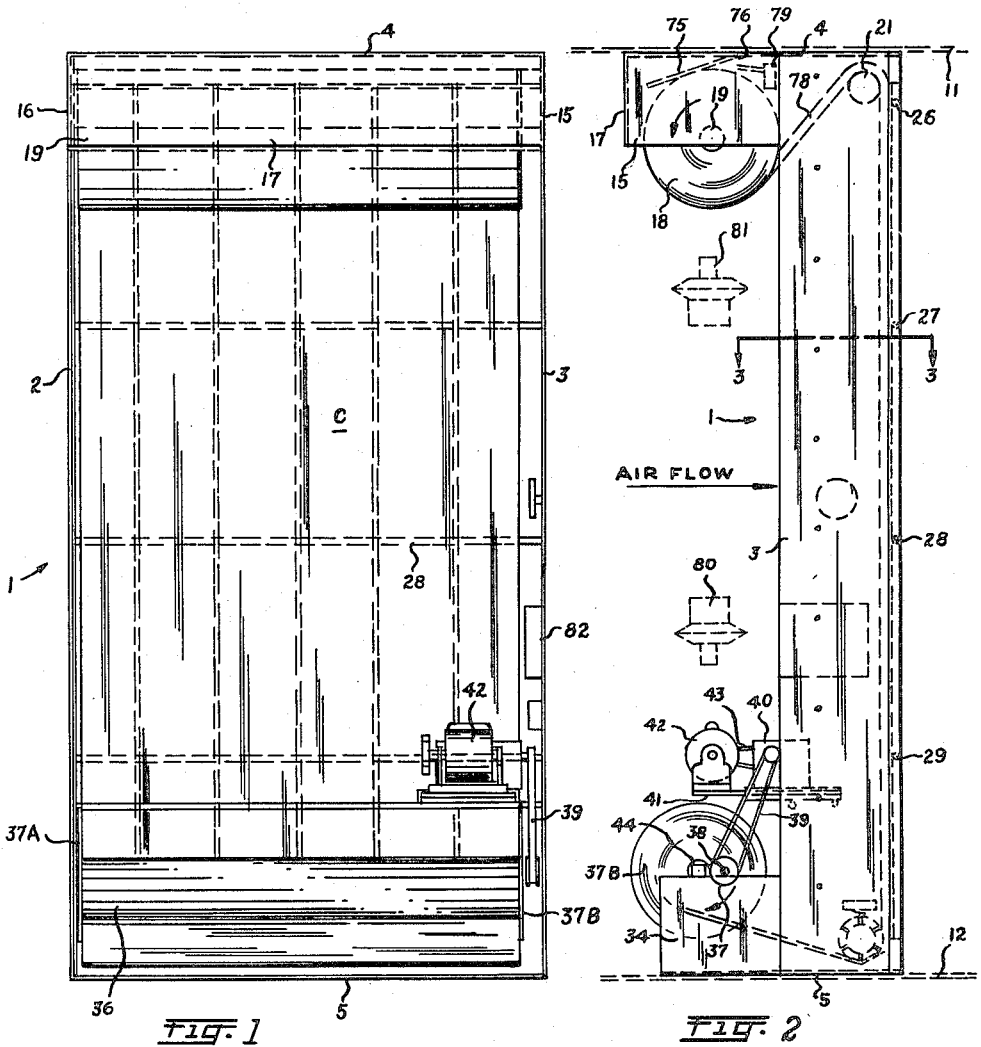

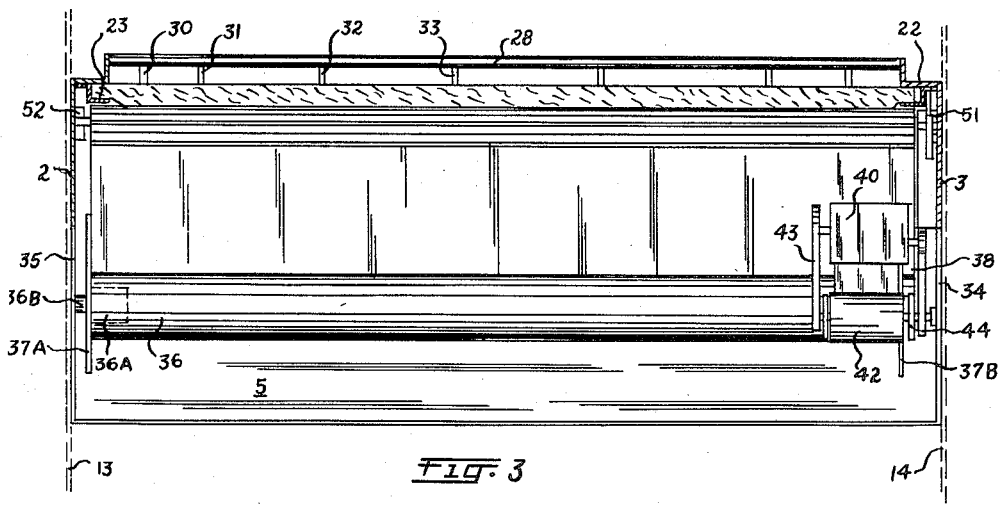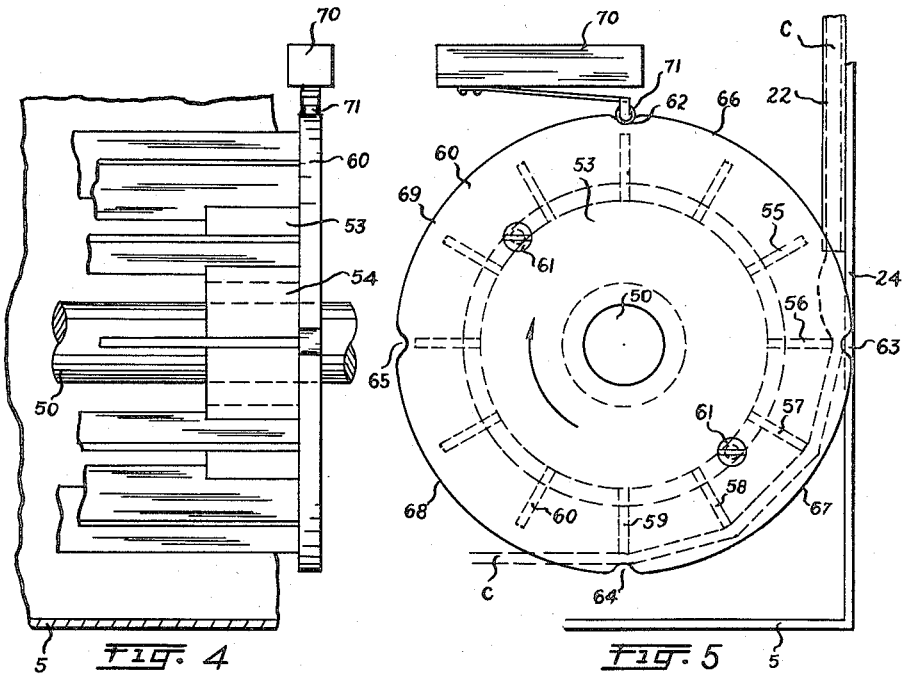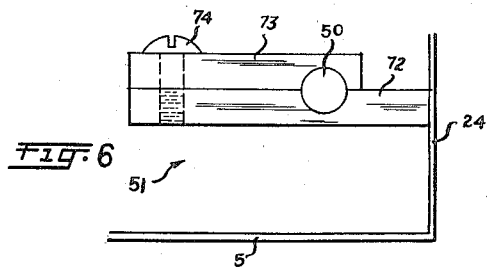

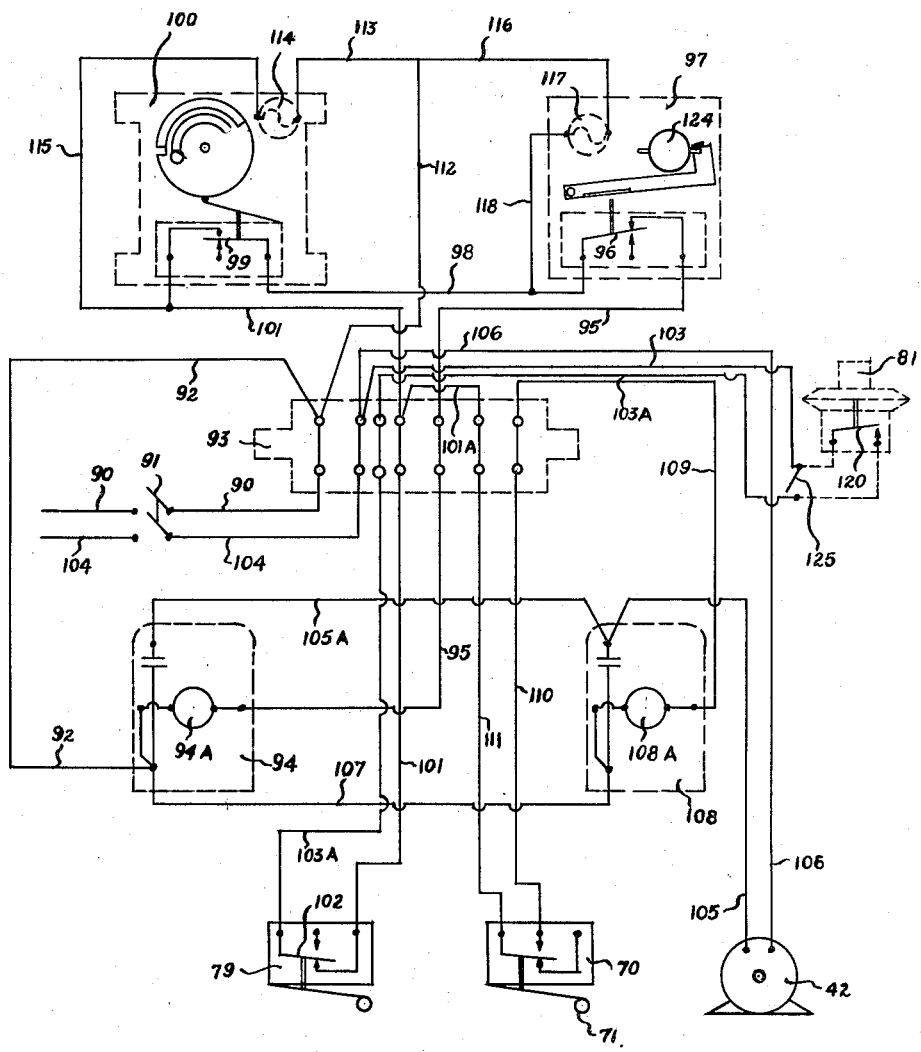

BY W.E. Sherwood

ATTORNEY

United States Patent Office 2,848,064
Patented Aug. 19, 1958

2,848,064

AIR AND GAS FILTER HAVING AUTOMATICALLY CONTROLLED MOVEMENT OF FILTER CURTAIN

William K. Gregory, John F. Babbitt, and Langston P. Bryant, Louisville, Ky., assignors to Continental Air Filters, Inc., Louisville, Ky., a corporation of Delaware Application March 29, 1957, Serial No. 649,403

19 Claims. (Cl. 183—62)

This invention relates to a new and improved filter for fluids of gaseous nature, such as air, and especially to filters having a movable filter medium in the form of a curtain through which such fluid is passed. More particularly, it relates to a new and improved arrangement for automatically controlling the movement of the filter curtain in an efficient manner and without impairment of its filtering action.

An object of our invention is to provide an improved filter having a metering means for controlling the advancement of the filter medium.

Another object is to provide an improved filter having a means for intermittently advancing the filter medium a predetermined distance in a predetermined period of time and without adversely affecting the filtering function by stretching of the medium or by breaking of the sealing thereof.

Another object is to provide an improved system for controlling the movement of roll-type air and gas filters, including a control factor based directly upon amount of filter medium advanced through the filter space.

A further object is to provide an improved mounting arrangement for roll-type filters wherein one surface of the filter medium may be maintained in contact with unfiltered gaseous medium throughout its path of travel and without requiring special shielding structure for the roll of fresh medium.

A further object is to provide an improved filter adapted for ready maintenance and for ease in interchangeability of metering cams.

Still a further object is to provide a filter control system for insuring maximum filtering efficiency of a filter medium under both normal and emergency filtering loads.

Other objects and advantages will become apparent as the description proceeds and when considered in conjunction with the accompanying drawings in which:

Fig. 1 is a front elevation of a preferred form of our filter;

Fig. 2 is a side elevation of the filter of Fig. 1;

Fig. 3 is a partial sectional view to a larger scale and taken along line 3—3 of Fig. 2;

Fig. 4 is side elevation of one end of the metering means and to an enlarged scale;

Fig. 5 is an end view of the metering means of Fig. 4 and showing the replaceable cam and the path of travel of the filter curtain over the metering means;

Fig. 6 is a detail in end elevation of a means for detachably retaining the metering means in place within the filter frame;

Fig. 7 is a wiring diagram illustrating one form of control system for the filter, both with and without the use of the filter media saver;

Figure 8:
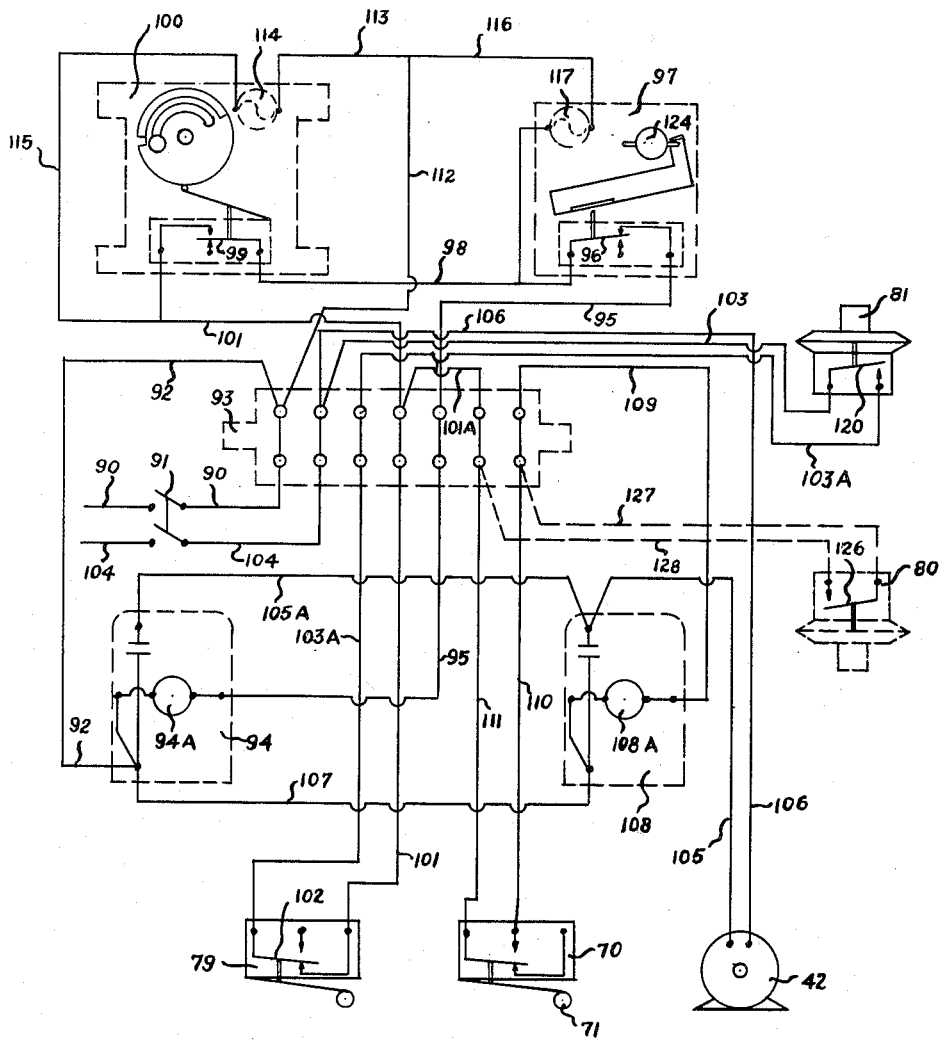
Fig. 8 is a wiring diagram illustrating a second form of control system for the filter, with the filter media saver, and both with and without the high-limit control feature.

In accordance with our invention, we provide an automatically controlled filter whose movable filter curtain is normally advanced under a control which is directly related to the amount of curtain which passes over a metering device in a predetermined time period. An improved filter frame and mounting arrangement for a roll of fresh filter medium and for a rewind roll of spent filter medium is provided and incorporates features of improved sealing, non-stretching of the filter medium in the filtering space and retention of the dirty side of the curtain constantly on the upstream side of the fluid medium which is being filtered. The control system moreover incorporates features which operate independently of the size of the rewind roll thus eliminating the need for slip clutches, dual time clocks and similar known adaptations for advancing the filter curtain at a prescribed rate of speed. In addition, an optional use of one or more improved supplementary controls based upon resistance to air flow through the filter curtain, is made possible and may be employed without requiring modification of the remaining structure of the filter apparatus.

Referring now to Figs. 1 to 3, we provide an elongated filter frame indicated generally at 1 and having side walls 2 and 3, a top 4 and a bottom 5 defining a filter space therebetween. This frame has a configuration suitable for sealed insertion in a conventional duct system having top and bottom walls shown by dotted lines 11 and 12 and side walls 13 and 14. Adjacent one end of the frame and preferably at the top thereof, a partial enclosure is formed having side walls 15 and 16 extending downward from the top of the frame and with a front wall 17 facing the upstream side of the duct. The enclosure side walls provide bearings upon which a readily detachable first roll 18 of fresh filter medium is rotatably mounted, along its shaft axis 19. This filter medium may be of any conventional type, but for general use in cleaning air of dust, lint and the like, we prefer the glass wool type of filter medium impregnated with a suitable oil and with the medium normally having a thickness in the order of one inch or more. As known, the filter supply roll may be wound upon an open-ended tube of heavy cardboard, or the like, and short stub shafts (not shown) comprising a plug at one end for closely fitting into the tube and a bearing means at a second end for resting in inclined supports on the enclosure walls 15 and 16, are preferably provided for insertion into each end of the tube. In this way the stub shafts can be readily inserted or removed from a given tube and reused with the tube of the next supply roll. Also, the supply roll may be readily inserted in the supports on the enclosure walls.

As the medium is advanced as a curtain C across the filter space, it leaves roll 18 and passes over a guide idler roller 21 and with its extreme edges moving in somewhat compressed condition into confronting sealing channels 22 and 23 (Fig. 3). These channels extend substantially the entire distance between the top and bottom of the frame and at their lower open ends direct the downstream side of the moving curtain against a compression plate 24 (Fig. 5) upstanding from the bottom 5 of the filter frame and extending across the entire width of the frame.

On the downstream side of the filter frame a suitable grill work is provided across the open filter space and may include horizontal bars, such as 26, 27, 28 and 29, as well as vertical bars which are in contact with the filter curtain, such as shown at 30, 31, 32 and 33. The grill work serves to prevent distension of the filter curtain and to give mechanical support to the filter frame. If desired, the vertical bars adjacent the sealing channels may be spaced closer together than those at the central part of the frame, thus to provide additional support to the curtain in the region adjacent the sealing zones.

Attached to the bottom 5 of the filter frame and at a suitable distance upstream from the compression plate 24 are side walls 34 and 35 serving as a mounting for bearings upon which a readily detachable second, or rewind, roll 36 of spent filter medium is rotatably mounted.

This roll, as in the case of the supply roll 18, is preferably mounted on a cardboard tube, which, as seen in Fig. 3, may have at one end a stub shaft with a plug portion 36A extending into the tube and with a bearing 36B at its other end supported in side wall 35 and with an end plate 37A attached to the stub shaft. At its second or drive end, the rewind roll 36 is provided with a stub shaft which has a plug portion extending into the tube and suitably keyed thereto. This stub shaft likewise has an end plate 37B and at its outer end is provided with a gear 44 and a bearing for mounting in side wall 34. The gear 44 is driven by engagement therewith of a second gear 38 suitably mounted in fixed bearings on wall 34 and driven in turn by chain 39 which is driven by a gear reduction unit 40. The gear reduction unit may be mounted upon a bracket 41 extending inwardly from wall 3 of the frame and supporting in addition a suitably controlled electric motor 42 and which drives that unit by a suitable belt 43. As will thus be seen, the entire roll 36, and its attachments, is free to be lifted from its bearings and to be moved to a point of disposal for the spent filter curtain. The stub shafts preferably are removably retained in position on their bearing housing by means of simple pins which wedge those shafts into the proper axis for rotation. When the spent roll is replaced, all that is necessary is to provide a new tube, remove the stub shafts with their attachments from the old tube, and insert the same in the new tube, whereupon the new rewind assembly is mounted in place with gear 44 in mesh with gear 38. Maintenance and servicing of the filter equipment accordingly is greatly simplified.

Considering now Figs. 4 and 5, a significant feature of our invention includes a metering device, which is driven by movement of the advancing filter curtain and which exerts a control upon the operation of motor 42 in dependence upon the amount of curtain passing over the metering device in a predetermined period of time. The metering device may, in the broader aspects of our invention, comprise any type of rotatable idler means having a peripheral contact with the filter curtain and serving to restrain the free movement of the curtain to the rewind roll, but we prefer to employ a device which applies a uniform tension across the entire width of the curtain and which does not distort the curtain as it passes through the open filter space. Our preferred metering means accordingly includes a central shaft 50 having its ends removably resting in supports 51 and 52 which may be supported by the side walls 2 and 3. A plurality of spiders are mounted upon the shaft 50 by means of rolling contact bearings, one spider 53 and bearing 54 being shown in Fig. 4. At their outer peripheries, the spiders have rigidly attached thereto a plurality of curtain-engaging flights, or splines, such as shown at 55, 56, 57, 58, 59 and 60. Each flight has a length sufficient to engage with the filter curtain emerging from the lower ends of sealing channels 22 and 23, and to compress the curtain as it moves along compression plate 24. The flights are at least as long as the width of the curtain and preferably are slightly longer than the curtain width so that they are enabled to compress the curtain across the entire width of the frame. Moreover, idler roller 21 is somewhat longer than the width of the curtain with the result that the curtain is fed uniformly into the tops of the sealing channels and is drawn uniformly from the bottoms of those channels.

As will thus be apparent, the metering means serves, in addition to its control function, the purpose of distributing stresses upon the filter curtain across its entire width. As best seen in Fig. 5, the curtain C moves in a straight line under tension from flight 59 to the tangent of the circumference of rewind roll 36 between the end plates 37A and 37B and thus is tightly wound on the roll 36. Between flights 59—58, 58—57 and 57—56 the curtain lies as the chord of a circle and no slippage of curtain with respect to the metering means occurs. In other words, the amount of curtain being advanced is directly related to the periphery of the flights. We, therefore, incorporate as a part of our control system a cam 60 readily detachable as by means of screws 61 and mounted upon the spider 53 at one end of shaft 50. This cam is provided with a series of uniformly spaced depressions 62, 63, 64 and 65 between which a series of cam ridges 66, 67, 68 and 69 are disposed. For a purpose later to appear, a switch 70, having an arm biased to carry roller 71 constantly in contact with the periphery of cam 60, is employed in our control circuit to motor 42.

As the description proceeds, it will become apparent that the amount of angular rotation of cam 60 bears a prescribed ratio to the amount of filter curtain metered by the metering means to which the cam is attached. Moreover, the cam may readily be detached from the spider without disturbing the remainder of the filter apparatus and another cam, having a different number of depressions and ridges, can be substituted therefor.

The number of flights employed upon the metering means is not critical, provided that one flight, such as 55, is in position to engage with the moving curtain and to move that curtain to fully compressed condition against plate 24, as at 56, as soon as a preceding flight, such as 57 leaves its position with respect to the compression plate. Since one flight is always in compression contact with the curtain, no abrupt pull from the rewind roll 36 can be transmitted to the curtain held in the sealing channels. Thus, no abnormal distortion of the curtain occurs and no danger of pulling the curtain edges from their sealing channels is possible.

Referring again to Fig. 2, it will now be seen that the exposed surface of supply roll 18, while in contact with unfiltered gas, may pick up dirt or the like, but that, due to the roll arrangement wherein roll 18 turns counter-clockwise, as shown, that particular surface of the filter curtain continually remains on the upstream side of the filter. Thus, it requires no special shielding which would serve as obstructions to flow of gas. Consequently, substantially the entire cross section of the duct is occupied by filter curtain. Since no special shields are needed for either roll 18 or roll 36, it is particularly easy to re-service these rolls when the supply of filter medium is exhausted.

As seen in Fig. 6, one convenient device for detachably retaining shaft 50 of the metering means in position on its bearing housings is shown generally at 51 and may comprise a simple clamp having a support 72 with a recess therein for supporting the end of shaft 50. A cover plate 73 having a coacting recess therein for supporting the same shaft and with a readily detachable fastening such as a screw 74 for pinning the shaft support parts in fixed relation may be provided. A similar support 52 is used at the other end of the shaft 50. Merely by loosening the screws 74 and removing cover plates 73, the entire metering means may be lifted from operative position and a new cam 60 may be readily substituted thereon.

For the dual purpose of providing a slight braking action on roll 18 and for shielding we employ an imperforate plate 75 hinged at one end 76 upon the frame top and resting upon the surface of supply roll 18. This plate extends into close proximity to walls 15 and 16 of the enclosure and aids in shielding the clean side of the advancing filter curtain in the region shown at 78.

When the plate 75 drops against the cardboard tube in roll 18, showing that the supply of filter medium is exhausted, it actuates a runout cut-off switch 79 which forms an essential part of our control circuits now to be described. If desired, an alarm of a suitable nature, such as a bell or light, not shown, may also be actuated when the plate approaches switch 79. In addition, as a part of our improved control, we provide a high-limit pressure switch 80, and a low-limit pressure switch 81, of conventional construction and suitably mounted upon the filter frame on the upstream side of the duct. These pressure switches may be used either solely, jointly, or with both switches disconnected from the control circuits at the option of the user, and without departing from our invention. Within control box 82 mounted upon the frame we also employ a time clock, reset timer, suitable relays and electrical connections serving as a control circuit for the above described filter apparatus.

With the foregoing description in mind, reference now is made to Figs. 7 and 8 showing alternate wiring diagrams for the electrical control circuits of our filter. In general, we provide the circuits with an optional first overriding control factor dependent upon the resistance to flow of gaseous fluid through the filter curtain, a second overriding control factor subordinate to the first control factor, and based upon the amount of curtain advanced in a predetermined period of time and a third or last control factor based upon an intermittent starting and stopping of motor 42 at predetermined intervals of time. In all cases, the interval of time of the third factor is at least as long as the time period of the second factor and, preferably, is much longer. In no event will the circuit start the motor when cut-off switch 79 has been actuated by plate 75.

The time clock 100, reset timer 97 and relays 94 and 108, shown in Figs. 7 and 8, are of conventional construction and with the time clock being adapted to close its contact briefly at predetermined intervals of time, such as once during each 6 or 12 or 24 hours, depending upon the capacity of the filter and the filtering load expected. Since we provide a convenient arrangement for interchanging the cams of the metering means, the clock may be calibrated and set at the factory and still permit flexibility of filter use without the necessity for maintenance personnel adjusting the delicate clock mechanism at the point of use. Moreover, the reset timer is of the type adapted for automatic resetting of the circuit after interruption of the circuit by the opening of the clock contact.

Considering now Fig. 7, in an installation in which resistance to flow is not an important consideration, or in which it is desired to add a media saver control at a later date, a circuit is established from line 104, upon closing of switch 91, through conductor 104 on terminal board 93, through conductor 103, closed shorting switch 125, conductor 103A, contact 102 of the runout cut-off switch 79, conductor 101, shunt 115 of the time clock, motor 114 of the clock, shunt 113, conductor 112, thence to return line 90 on the terminal board. This basic circuit is maintained at all times while the filter is in use, except when the runout cut-off switch 79 has opened, due to exhaustion of filter medium supply, or in the special situations later to be described. Thus, the clock motor is constantly driven while the basic circuit is closed and the normal clock timing operation is assured.

At the expiration of a predetermined time interval, the contact 99 of clock 100 is closed for a brief period and a circuit which may conveniently be called "motor-starting control circuit A" is established. When contact 99 closes, a circuit is made from line 104, through conductor 103, closed shorting switch 125, conductor 103A, contact 102 of the runout cut-off switch 79, conductor 101, contact 99, conductor 98, contact 96 of reset timer 97, conductor 95, magnetic holding coil 94A of relay 94, conductor 92, and thence to return line 90. Shorting switch 125 is usually provided only when the filter media saver is not used or when it is intended to be added later to a given installation.

When this control circuit A is closed, the magnetic holding coil 94A closes the contact on relay 94 whereupon current flows from line 104, conductor 106, motor 42, conductor 105, branch connector 105A, conductor 92, thence to return line 90. Promptly after motor 42 begins to operate, tension is applied to curtain C by means of rewind roll 36 and the metering means is caused to rotate by the advancing curtain. At this time cam 60, Fig. 5, lifts roller 71 causing switch 70 to close and to remain closed until roller 71 drops into the next depression on the cam, as shown at 65. Closing of switch 70 establishes another control circuit which may conveniently be called "control circuit B" and which is made from line 104, through conductor 103, closed shorting switch 125, conductor 103A, contact 102 of runout cut-off switch 79, conductor 101, connection 101A at the terminal board, conductor 111, switch 70, conductor 110, conductor 109, magnetic holding coil 108A of relay 108, conductor 107, conductor 92 and thence to return line 90. When this control circuit is established, the magnetic holding coil 108A closes the contacts of relay 108, whereupon current flows from line 104, through conductor 106, motor 42, conductor 105, conductor 107, conductor 92, and thence to return line 90.

In the meantime, when contact 99 closed upon clock 100, a temporary circuit was established from conductor 98, through shunt connection 118, reset timer motor 117, conductor 116, conductor 112, and thence to return line 90. Cam 124 of the reset timer 97 is driven by motor 117 against the action of a spring as known in this type of apparatus, and when rotated to a predetermined extent, the cam opens the contact 96 against the action of that spring. When contact 96 is opened, the control circuit A is interrupted. However, the movement of cam 124 is so arranged that before it opens contact 96, sufficient time has elapsed to permit control circuit B to become established by driving motor 42, roll 36 and the metering means a sufficient distance to close the switch 70. Sometime after the control circuit B has been established, the time clock through its cam rotation reopens its contact 99 and the temporary circuit through reset timer motor 117 is opened, whereupon the spring resets the timer 97 by forcing the contact 96 again into its closed position in readiness for the next operation of the time clock.

As an alternative circuit, we provide an improved control which conserves filter medium during start up operation of the filter and as shown to the right of shorting switch 125 in Fig. 7. One advantage of this circuit is that it is self-contained and is not dependent upon simultaneously controlling the motors for driving the fans which move the gaseous fluid being filtered. Frequently, such fans are driven by motors using a different voltage and phase from that of the motor driving the filter curtain and by our invention we effect a considerable savings in wiring and cost over such previous systems of control.

As known to those skilled in the art, when a new filter curtain is installed, its resistance to air flow may be in the order of 0.2 inch of water, whereas, the rated cleaning effect of the filter may be based upon an average resistance of about 0.4–0.45 inch of water. Thus, if the above-described circuit of Fig. 7 is employed, the motor 42 will be actuated solely under the starting control of the time clock and fresh medium will automatically be advanced to the rewind roll even though it has not employed its full filtering capacity. We avoid this disadvantage and insure the efficient use of a new filter curtain by means of the low-limit pressure switch 81 having contact means 120, as seen in Fig. 7. This low-limit pressure switch may be set to close at a predetermined pressure, for example, at 0.4 inch of water.

Considering now this improved circuit, with a new filter curtain in place, and with the resistance to flow of air through the duct being less than the closing setting of pressure switch 81, the contact 120 of that switch remains open and since that contact is in series with the runout cut-off switch 79, the control circuit A remains open and the filter does not operate. It will be understood that, if provided with the shorting switch 125, as above described, in connection with our invention wherein the media saver is not used, that switch is open at this time.

When the new filter curtain has collected sufficient dirt to actuate the pressure switch 81 and to close its contact 120, the circuit is completed between line 104, conductor 103, contact 120, conductor 103A, thus establishing control circuit A and permitting operation as heretofore described. This pressure switch 81 overrides all other controls and renders them inoperative unless the resistance through the filter is at least as great as the predetermined setting of that pressure switch. Thus, when the fan is shut off and no air is passing through the filter, pressure switch 81 automatically opens the circuit to the controls of the filter and leaves the filter inoperative until the circuit is reestablished by starting the fan and causing the predetermined resistance to flow again to become evident.

Referring now to Fig. 8, another alternative circuit is shown wherein both a low-limit pressure switch and an optional high-limit pressure switch is employed with our apparatus. When it is desirable to provide for emergency conditions, as in a region of dust storms, or the like, a high-limit pressure switch 80 is used and serves as a second overriding control factor in the filter operation. This switch may be a conventional device responsive to the resistance to flow through the filter and having a contact 126 adapted to close a shunt circuit through conductors 127 and 128 and which are connected at the terminal board to conductors 110 and 111, respectively, thus to shunt out switch 70. When closed by the attainment of a predetermined pressure indicating that the filter is dirty, the switch 80 by-passes switch 70 and establishes operation of motor 42 by means of the previously described control circuit B. Preferably, switch 80 is set to operate at a resistance to flow in the order of 0.60 inch of water. When circuit B is thus established under this emergency condition, motor 42 operates and will continue to operate until sufficient clean filter curtain has been drawn across the duct to reduce the resistance to flow to its normal operating range. When this is accomplished, pressure switch 80 opens its contact 126 and the filter is again operated under normal controls.

Having thus described our invention, many features which, for brevity, have been minimized in the description, will be apparent to those skilled in the art. For example, the control is independent of the increasing diameter of the rewind roll, as the spent curtain is rewound, thus providing a simplified control without use of slip clutches, chain conveyors on sprockets or the like; the spent curtain is wound tightly on the rewind roll by reason of the resistance placed thereon by the metering means; the metering means is disposed and constructed so that it does not clog with loose dirt or lint; and the filter curtain is not distorted by the advancing mechanism provided therefor.

In accordance with the patent statutes, we have described what at present is considered to be the preferred embodiments of our invention, but it will be obvious to those skilled in the art that various changes and modifications may be made therein without departing from the true spirit and scope of the invention and we, therefore, aim to cover in the appended claims all such equivalent variations and modifications.

What we claim as new and desire to secure by Letters Patent is:

1. In an air and gas filter having a roll for winding a filter curtain thereon, means for driving said roll, means comprising a rotatable member in contact with said curtain and driven thereby for metering the amount of curtain advanced to said roll and being movable simultaneously with said advancing curtain, and means for controlling said driving means in dependence upon the movement of said metering means.

2. In an air and gas filter having a roll for winding a filter curtain thereon, means for driving said roll, means comprising a rotatable member for metering the amount of curtain advanced to said roll, said metering means being in contact with said curtain along the width thereof and being driven thereby, and means for controlling said driving means in dependence upon the movement of said metering means.

3. In an air and gas filter having a roll for winding a filter curtain thereon, means for driving said roll, means for metering the amount of curtain advanced to said roll, said metering means being in contact with said curtain along the width thereof and being driven thereby, means for compressing the curtain in contact with said metering means whereby said metering means serves to restrain the movement of said curtain and to distribute a uniform tension thereon across the entire width thereof, and means for controlling said driving means in dependence upon the movement of said metering means.

4. An air and gas filter having a frame, a supply roll of filter curtain, a rewind roll, means for driving said rewind roll, means attached to said frame for sealing the edges of said curtain during a portion of its passage from said supply roll to said rewind roll, means for metering the amount of curtain advanced to said rewind roll, said metering means being in contact with said curtain along the width thereof and driven thereby, the length of said metering means being such that through the action of said metering means a uniform tension may be applied to said curtain for retaining said curtain edges in said sealing means, and means for controlling said driving means in dependence upon the movement of said metering means.

5. An air and gas filter having a frame, a supply roll of filter curtain mounted on an inner surface of said frame, a rewind roll, means for driving said rewind roll, said supply roll being mounted for rotation in a direction serving to maintain the dirty surface of said filter curtain out of contact with filtered gaseous fluid during passage of the curtain from said supply roll to said rewind roll, means comprising a rotatable member in contact with the dirty surface of said curtain and driven thereby, said rotatable member serving to meter the amount of curtain advanced to said rewind roll and being movable simultaneously with said advancing curtain, and means for controlling said driving means in dependence upon the movement of said metering means.

6. In an air and gas filter having a roll for winding a filter curtain thereon, means for driving said roll, including a motor and a power circuit therefor, means for metering the amount of curtain advanced to said roll and movable simultaneously with said advancing curtain, said metering means comprising a rotatable member in contact with said curtain and driven thereby, and a switch in said circuit controlled by said metering means for interrupting and establishing the circuit to said motor.

7. In an air and gas filter having a roll for winding filter curtain thereon, means for driving said roll, including a motor and a power circuit therefor, rotatable means for metering the amount of curtain advanced to said roll and driven by said advancing curtain, a cam attached to said metering means and a switch in said circuit controlled by said cam for interrupting and establishing the circuit to said motor.

8. Apparatus as defined in claim 7 wherein said cam is adapted for ready attachment to or detachment from said metering means without disturbing the remainder of said filter thereby to permit substitution of a different cam and metering of a different amount of filter curtain.

9. An automatically controlled air and gas filter having a movable filter curtain, a roll for advancing said curtain, a metering means driven by said advancing curtain, said metering means comprising a rotatable member in contact with said curtain, means for driving said roll including a motor and a power circuit therefor, a time actuated switch in said circuit for starting said motor at predetermined intervals of time, and a switch in said circuit actuated by said metering means for stopping said motor after advancement of a predetermined amount of filter curtain.

10. An automatically controlled air and gas filter having a movable filter curtain, a roll for advancing said curtain, a metering means driven by said advancing curtain, means for driving said roll, including a motor and a power circuit therefor, a time-actuated switch in said circuit for starting said motor at predetermined intervals of time, a switch in said circuit actuated by said metering means for stopping said motor after advancement of a predetermined amount of curtain, a high-limit pressure switch mounted on the upstream side of said filter and having means adapted to close a shunt circuit upon attainment of a predetermined resistance to flow for a gaseous fluid being filtered, said shunt circuit being connected to said power circuit and including said pressure switch and shunting said time-actuated and metering-means-actuated switches, whereby said motor is automatically driven upon closing of said pressure switch.

11. An automatically controlled air and gas filter having a movable filter curtain, a roll for advancing said curtain, a metering means driven by said advancing curtain, means for driving said roll, including a motor and a power circuit therefor, a time-actuated switch in said power circuit for starting said motor at predetermined intervals of time, a switch in said power circuit actuated by said metering means for stopping said motor after advancement of a predetermined amount of curtain, a low-limit pressure switch mounted on the upstream side of said filter and having a means adapted to keep a series circuit open until attainment of a predetermined resistance to flow for a gaseous fluid being filtered and thereafter to close said series circuit, said series circuit including said time-actuated and metering-means-actuated switches and said pressure switch, whereby said motor circuit is open until said pressure switch closes.

12. An automatically controlled air and gas filter having a movable filter curtain, a roll for advancing said curtain, a metering means driven by said advancing curtain, means for driving said roll including a motor and a power circuit therefor, a time-actuated switch in said power circuit for starting said motor at predetermined intervals of time, a switch in said power circuit actuated by said metering means for stopping said motor after advancement of a predetermined amount of curtain, a low-limit first pressure switch mounted on the upstream side of said filter and having means adapted to keep a series circuit open until attainment of a predetermined resistance to flow for a gaseous fluid being filtered and thereafter to close said series circuit, said series circuit including said time-actuated and metering-means-actuated switches and said first pressure switch, a high-limit second pressure switch mounted on the upstream side of said filter and having a means adapted to close a shunt circuit upon attainment of a predetermined resistance to flow for said fluid, said shunt circuit being connected to said power circuit and including said second pressure switch and shunting said time-actuated and metering-means-actuated switches.

13. In an air and gas filter having a movable filter curtain, means for moving said curtain including a motor and a power circuit therefor, means for metering the amount of curtain advanced through said filter and comprising a shaft, a plurality of spiders rotatably mounted on said shaft, curtain-engaging members mounted upon said spiders and extending into the path of travel of said curtain for engagement thereby, a cam mounted upon a spider adjacent one end of said shaft and a switch in said power circuit adapted to be actuated by said cam.

14. Apparatus as defined in claim 13 including a rewind roll driven by said motor and adapted to move said curtain under tension from said metering means, and wherein said curtain-engaging members are spaced from each other thereby to permit curtain to be pulled taut by said rewind roll while passing from said metering means.

15. In an air and gas filter having a roll for winding filter curtain thereon, means for driving said roll including a motor and a power circuit therefor, a time clock adapted to close said power circuit at predetermined intervals of time, means for limiting the time during which said clock closes said circuit, rotatable means for metering the amount of curtain advanced to said roll, a cam attached to said metering means, and a switch in said circuit and operable by said cam for interrupting said circuit after advancement of a predetermined amount of curtain, said time-limiting means being set to hold said circuit closed for a smaller period of time than the time during which said cam holds said circuit closed.

16. Apparatus as defined in claim 15 wherein said time-limiting means includes means for reestablishing the circuit to said clock following interruption thereof by said time-limiting means thereby to place said circuit in readiness for subsequent closing of said circuit by said clock after said predetermined interval of time.

17. Apparatus as defined in claim 15 including a pressure operated switch in said circuit responsive to the resistance to flow through said filter curtain and adapted to remain open until attainment of a predetermined resistance to said flow.

18. Apparatus as defined in claim 15 including a shunt circuit around said cam-operated switch in said power circuit, a pressure operated switch in said shunt circuit responsive to resistance to flow through said filter curtain and adapted to close said shunt circuit upon attainment of a predetermined resistance to said flow, thereby to start said motor.

19. Apparatus as defined in claim 15 including a first pressure operated switch in said power circuit, a shunt circuit around said cam-operated switch in said power circuit, a second pressure operated switch in said shunt circuit, said first switch being adapted to remain open until attainment of a first predetermined resistance to flow through said curtain and said second switch being adapted to remain open until attainment of a second and greater predetermined resistance to said flow.

References Cited in the file of this patent

UNITED STATES PATENTS

| | | |
|---|---|---|
| 2,152,900 | Manning | Apr. 4, 1939 |
| 2,626,012 | Persons | Jan. 20, 1953 |
| 2,722,998 | Hall | Nov. 8, 1955 |
| 2,782,612 | Spiegelhalter | Feb. 26, 1957 |